United States Patent
Siraky

[11] Patent Number: 6,089,116
[45] Date of Patent: Jul. 18, 2000

[54] GEARING STAGE

[75] Inventor: Josef Siraky, Donaueschingen, Germany

[73] Assignee: Max Stegmann GmbH Antriebstechnik-Elektronik

[21] Appl. No.: 09/158,176

[22] Filed: Sep. 21, 1998

[30] Foreign Application Priority Data

Oct. 13, 1997 [DE] Germany .......................... 197 45 177

[51] Int. Cl.[7] .................................... F16H 1/06
[52] U.S. Cl. ................ 74/424.5; 74/413; 74/DIG. 4
[58] Field of Search .................. 74/412 R, 413, 74/424.5, DIG. 4

[56] References Cited

U.S. PATENT DOCUMENTS

| | | | |
|---|---|---|---|
| 2,378,129 | 6/1945 | Chambers | 74/DIG. 4 X |
| 2,510,675 | 6/1950 | Baruch | 74/DIG. 4 X |
| 3,301,091 | 1/1967 | Reese | 74/DIG. 4 X |
| 3,688,597 | 9/1972 | Watson | 74/424.5 |
| 3,792,578 | 2/1974 | Hetzel | 74/DIG. 4 X |
| 4,196,639 | 4/1980 | Spodig | 74/DIG. 4 X |
| 4,850,821 | 7/1989 | Sakai | 74/DIG. 4 X |
| 5,129,276 | 7/1992 | Fahy et al. | 74/424.5 |
| 5,569,967 | 10/1996 | Rode | 74/DIG. 4 X |

FOREIGN PATENT DOCUMENTS

| | | | |
|---|---|---|---|
| 0 305 685 A1 | 7/1988 | European Pat. Off. | |
| 235564 | 6/1911 | Germany . | |
| 860087 | 12/1952 | Germany | 74/DIG. 4 |
| 3306446 A1 | 9/1984 | Germany . | |
| 43 02 216 A1 | 8/1994 | Germany . | |
| 1449367 | 1/1989 | U.S.S.R. | 74/DIG. 4 |
| 2 052 173 | 6/1980 | United Kingdom . | |
| 2 284 105 | 5/1995 | United Kingdom . | |
| WO94/17583 | 8/1994 | WIPO . | |
| 094019625 | 9/1994 | WIPO | 74/DIG. 4 |

*Primary Examiner*—David A. Bucci
*Assistant Examiner*—Brandon C. Stallman
*Attorney, Agent, or Firm*—Foley, Hoag & Eliot

[57] ABSTRACT

In a gearing stage, a driving first wheel has a ferromagnetic profiled rib which is circumferential in one thread, whereas a second driven wheel has permanently magnetic profiled ribs which are disposed in a multi-start manner and which extend only over a fraction of the circumference and are opposite the ferromagnetic profiled rib with a small air gap. The driving wheel drives the driven wheel via a magnetic reluctance coupling.

11 Claims, 1 Drawing Sheet

GEARING STAGE

BACKGROUND OF THE INVENTION

1. Field of the Invention

This invention relates to mechanical gearing and more particularly to providing a coupling between gears of a mechanical gearing.

2. Description of Related Art

Gear units which act as transmission gear units and reduction gear units are made up of one or more gearing stages. The gear units may be designed as toothed gears in which, in each gearing stage, a first driving gear wheel engages in a second driven gear wheel. However, toothed gears are subject to wear because of the tooth engagement.

If toothed gears are used as reduction gear units, the driven second wheel has a greater diameter (corresponding to the reduction ratio) than the driving first wheel. If a higher reduction ratio is desired, this may appreciably increase the dimensions of the gearing stage.

For example, in absolute rotational-angle-measuring systems, mechanical reduction gear units are used to determine the rotational angle in an absolute manner over a plurality of shaft rotations. The rotational-angle-measuring systems are, as a rule, coupled to electrical drives which rotate relatively rapidly, with rotational speeds of up to 12,000 revolutions/minute being encountered. Since the bearings for such high rotational speeds are expensive, a high reduction ratio is desirable for the first gearing stage so that a less expensive bearing can be used for the driven second wheel. If a hollow-shaft arrangement is used in such rotational angle measuring systems, the first driving wheel will have a relatively high diameter in order to be mounted on the hollow shaft, which results in a relatively high diameter second driven wheel, due to the desired high reduction ratio. This, in turn, results in a relatively large radial space requirement for the first gearing stage. In addition, the dimensioning of the second driven wheel results in a disadvantageous mass inertia of the driven wheel.

Thus, it is desirable to provide a gearing stage which makes possible small dimensions and a small mass moments of inertia as well as being largely wear-free.

SUMMARY OF THE INVENTION

According to the present invention, a gearing stage is provided in which a first wheel drives a second wheel via magnetic reluctance coupling. For this purpose, one of the wheels may have a circumferential profiled rib made of a ferromagnetic or permanently magnetic material, while the other wheel has multiple-start profiled ribs made of a permanently magnetic material. The wheels may be disposed so that the profiled ribs are opposite one another with a small air gap. When the driving first wheel is rotated, the driven second wheel rotates in such a way that the air gap between the profiled ribs and, consequently, the magnetic energy-in the air gap remain as small as possible.

In the arrangement described herein, the ratio of the number of threads of the two wheels determines the reduction or transmission ratio. If, for example, the driving first wheel has a single-start profiled rib and the second driven wheel has multiple profiled ribs which extend in each case over at least a fraction of the circumference, the result is a reduction ratio which corresponds to the number of threads of the profiled ribs of the second wheel.

Since the wheels are coupled via the magnetic reluctance without touching, the gear wheels may interact in a wear-free manner.

The reduction or transmission ratio is determined by the number of threads and is not structurally dependent on the radius of the wheels. It is therefore also possible to implement reduction gearing stages with small radial dimensions. In particular, even in the case of a reduction gearing stage, the second wheel can be designed with a substantially smaller diameter than the first wheel. This results in the possibility of achieving a high reduction ratio with small radial dimensions of the driven second wheel even in the case of a hollow-shaft arrangement, for example, of a rotational-angle-measuring system having a driving wheel, disposed on the hollow shaft, of the first gearing stage.

An inexpensive production cost results from the fact that the wheel having the larger diameter is provided with the ferromagnetic profiled rib, whereas the smaller of the wheels is designed with the permanently magnetic profiled ribs. As a result, it is possible to produce the smaller wheel with its profiled ribs integrally from permanently magnetic material.

The magnetic reluctance coupling may be capable of being loaded only up to a certain torque. If that torque is exceeded, the driven second wheel may get out of step. If the driven second wheel is designed with a small diameter, which is possible according to the invention, even in the case of a reduction gear unit, the mass inertia of the second wheel may br relatively small and the maximum torque is, as a rule, not exceeded. In addition, to avoid the driven second wheel from getting out of step even the case of large rotational acceleration, a further thread of a profiled rib made of a non-magnetic material is disposed, in a preferred embodiment, between the thread of the ferromagnetic profiled rib. In this connection, the profile height of the non-magnetic profiled rib may be greater than the profile height of the ferromagnetic profiled rib by at least the width of the air gap between the magnetically interacting profiled ribs. Should the driven second wheel lose magnetic engagement with the driving first wheel at high rotational accelerations, the nonmagnetic profiled rib engages mechanically with the rib of the driven wheel because of its greater profile height to drive the driven wheel by frictional engagement.

It is readily apparent that the gearing stage may be designed both as a reduction gear unit and as a transmission gear unit. It is furthermore apparent that the driving wheel or the driven wheel may be of permanently magnetic design, whereas the respective other wheel may have the ferromagnetic profiled rib. It is furthermore apparent that both wheels can each have single-start or multiple-start profiled ribs. The reduction or transmission ratio results from the ratio of the number of threads. Finally, it is apparent that the external circumference of the wheels can be engaged and one of the wheels may also be designed as annular wheel with the other wheel engaging with the internal circumference of the annular wheel.

BRIEF DESCRIPTION OF DRAWINGS

The invention is explained in greater detail below by reference to an exemplary embodiment shown in the drawing. The sole FIGURE is a perspective view of a gearing stage according to an embodiment of the present invention.

DETAILED DESCRIPTION OF THE PREFERRED EMBODIMENT(S)

Figure 1:
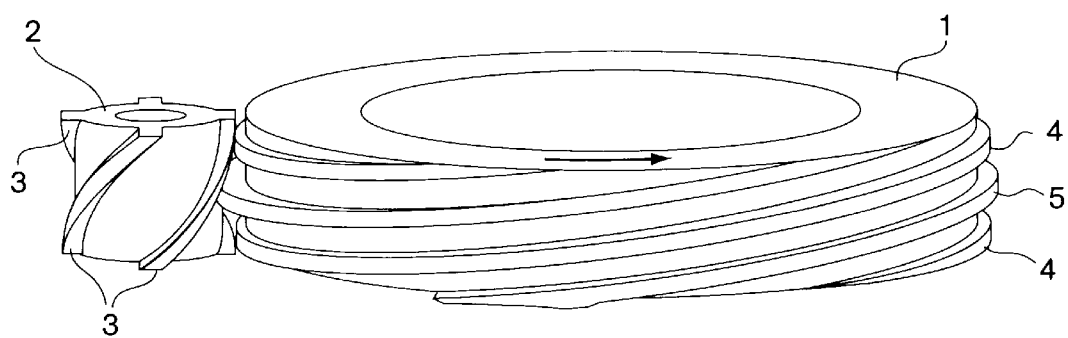

Referring to the sole FIGURE, a first driving wheel 1 is designed as an annular wheel which, for example, can be mounted on an input hollow shaft of an absolute rotational-angle-measuring system or can be designed as being integral with the input hollow shaft.

Disposed on a cylindrical external circumference of the wheel 1 is a profiled rib 4 made of a ferromagnetic material. The profiled rib 4 extends around the first wheel 1 as a single-start thread. Disposed between portions of the thread of the ferromagnetic profiled rib 4 is an additional profiled rib 5 which is composed of a nonmagnetic material, for example, aluminum. The non-magnetic profiled rib 5 and the ferromagnetic profiled rib 4 are consequently disposed after the fashion of a two-start thread.

A second wheel 2 is disposed proximal to the first wheel 1 at the external circumference of the latter. The sole FIGURE shows the axis of the second wheel 2 being substantially parallel to the axis of the first wheel 1. The axial dimension of the second wheel 2 corresponds to the lead of the profiled rib 4 of the first wheel 1. On a lateral surface thereof, the second wheel 2 has four profiled ribs 3 which are disposed after the fashion of a four-start thread. Each of the profiled ribs 3 extends over one quarter of the circumference of the wheel 2, an upper end of a profiled rib 3 in each case overlapping, in the angular position, a lower end of a preceding profiled rib 3. The second wheel 2 and the profiled ribs 3 thereof may be produced integrally from a permanently magnetic material.

With respect to axial spacing, diameter and profile height, the wheels 1, 2 are dimensioned so that a minimum air gap remains between the profile back of the ferromagnetic profiled rib 4 of the wheel 1 and the profile back of the permanently magnetic profiled ribs 3 of the wheel 2. The non-magnetic profiled rib 5 has a profile height which is greater than the profile height of the ferromagnetic profiled rib 4 by the width of the air gap.

Due to magnetic reluctance, the second wheel 2 is positioned in an angular position in such a way that the air gap between the permanently magnetic profiled rib 3 and ferromagnetic profiled rib 4 and, consequently, the magnetic energy in the air gap, remains minimal.

In the position shown in the sole FIGURE, the upper end of the thread of the ferromagnetic profiled rib 4 is opposite the upper end of a thread of the permanently magnetic profiled rib 3. If the first wheel 1 is driven, for example, in the direction of the arrow shown thereon, that region of the profiled rib 4 which faces the second wheel 2 travels downward in the axial direction because of the helical design of the ferromagnetic profiled rib 4. Accordingly, that axial region of the permanently magnetic profiled rib 3 which is situated at a corresponding height aligns itself so as to keep the air gap minimal. The second wheel 2 consequently rotates in the opposite direction from the first wheel 1. The ferromagnetic profiled rib 4 of the first wheel 1 has a thread lead which corresponds to the axial height of the second wheel 2. Therefore, if the first wheel 1 rotates through 360°, the region of the ferromagnetic profiled rib 4 facing the second wheel 2 travels downward by an axial height of the second wheel 2 and the second wheel 2 rotates through the angle over which the permanently magnetic profiled rib 3 extends, i.e. through 90° in the exemplary embodiment shown in the sole FIGURE. Because of the angular overlap of the start and end of the permanently magnetic profiled ribs 3, the ferromagnetic profiled rib 4 subsequently engages magnetically with an upper end of the next permanently magnetic profiled rib 3 in order to bring about the rotation of the second wheel 2 by another 90°. The gearing stage shown in the sole FIGURE consequently has a reduction ratio of 4:1.

Provided the ferromagnetic profiled rib 4 is magnetically engaged with the permanently magnetic profiled ribs 3, the non-magnetic profiled rib 5 remains between the permanently magnetic profiled ribs 3 of the second wheel 2 and consequently has no effect. However, if for some reason the magnetic reluctance force is insufficient to drive the wheel 2 (e.g., because of a high rotational acceleration of the driving wheel 1), the wheel 2 lags behind the wheel 1. As a result, the non-magnetic profiled rib 5 enters the region of the permanently magnetic profiled rib 3 and, because the rib 5 has a greater profile height, the rib 5 comes into frictional engagement with the rib 3. As a result, the driven wheel 2 is mechanically driven by the driving wheel 1 via the non-magnetic profiled rib 5.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. Gearing stage, comprising:
    a first wheel; and
    a second wheel driven by the first wheel, wherein one of the wheels has at least one profiled rib which is circumferential in at least one thread and an other one of the wheels has multiple-start profiled ribs which extend at least over a fraction of a circumference thereof, the profiled ribs of one of the wheels being at least one of: ferromagnetic and permanently magnetic and the profiled ribs of the other one of the wheels being permanently magnetic, the wheels being disposed substantially axially parallel to provide profile backs of the profiled ribs opposite one another with a relatively small air gap.

2. Gearing stage, according to claim 1, wherein one of the wheels is integral with the profiled ribs thereof and is composed of permanently magnetic material.

3. Gearing stage, according to claim 1, wherein the first wheel has a larger diameter than the second wheel, the first wheel has on an external circumference thereof a profiled rib which is circumferentially a single thread having a lead corresponding to an axial dimension of the second wheel, and wherein the second wheel has a number of profiled ribs disposed in a multiple-start manner, each extending over a fraction of the circumference corresponding to the number of profiled ribs.

4. Gearing stage, according to claim 3, wherein the first wheel is a hollow-shaft wheel.

5. Gearing stage, according to claim 4, wherein the gearing stage is a first reduction stage of a multi-turn absolute rotational-angle-measuring system.

6. Gearing stage, according to claim 1, wherein a profiled rib made of a non-magnetic material extends between the ferromagnetic profiled rib in the form of a second thread, the profile height of the non-magnetic profiled rib being greater than the profile height of the ferromagnetic profiled rib by at least the width of the air gap between the ferromagnetic profiled rib and the permanently magnetic profiled rib.

7. A gearing stage, comprising:
    a driving gear having at least one magnetic rib disposed circumferentially thereon, wherein said magnetic ribs do not touch;
    a driven gear having at least one magnetic rib disposed circumferentially thereon, wherein rotation of said driving gear causes rotation of said driven gear due to magnetic coupling between said at least one magnetic rib of said driving gear and said at least one magnetic rib of said driven gear; and at least one extra rib, disposed on one of the gears, said at least one extra rib providing mechanical engagement between the gears in response to the driven gear lagging the driving gear.

8. A gearing stage, according to claim 7, wherein said at least one extra rib is provided on said driving gear.

9. A gearing stage, according to claim 7, wherein said at least one extra rib is nonmagnetic.

10. A gearing stage, according to claim 9, wherein said at least one extra rib has a higher profile than said at least one magnetic rib of the gear on which said at least one extra rib is disposed.

11. A gearing stage, according to claim 7, wherein said at least one extra rib is a single rib that extends about an entire circumference of one of the gears.

* * * * *